United States Patent [19]

Pusch

[11] Patent Number: 4,743,478

[45] Date of Patent: * May 10, 1988

[54] BROAD BAND CAMOUFLAGE SCREEN HAVING A FREQUENCY DEPENDENT RADAR ATTENUATION

[75] Inventor: Gunter Pusch, Neckargemund, Fed. Rep. of Germany

[73] Assignee: Klaus-Werner Pusch, Lachen, Switzerland

[*] Notice: The portion of the term of this patent subsequent to Feb. 3, 2004 has been disclaimed.

[21] Appl. No.: 922,721

[22] Filed: Oct. 24, 1986

Related U.S. Application Data

[63] Continuation-in-part of Ser. No. 718,080, Apr. 1, 1985, Pat. No. 4,640,851.

[51] Int. Cl.[4] .......................... F41H 3/00; F41H 3/02; B32B 3/10
[52] U.S. Cl. ...................... 428/17; 428/132; 428/136; 428/332; 428/333; 428/461; 428/919
[58] Field of Search ............. 428/919, 17, 192, 213, 428/216, 333, 332, 136, 132, 461

[56] References Cited

U.S. PATENT DOCUMENTS

| | | | |
|---|---|---|---|
| 4,423,104 | 12/1983 | Pusch et al. | 428/919 X |
| 4,467,005 | 8/1984 | Pusch et al. | 428/919 X |
| 4,493,863 | 1/1985 | Karlsson | 428/17 |
| 4,495,239 | 1/1985 | Pusch et al. | 428/192 |
| 4,529,633 | 7/1985 | Karlsson | 428/17 |
| 4,640,851 | 2/1987 | Pusch | 428/17 |

Primary Examiner—Thomas J. Herbert
Attorney, Agent, or Firm—Michael N. Meller

[57] ABSTRACT

A conventional broad-band camouflage material comprising a base layer, a reflective metal layer and a paint layer which imitates the visible and near IR spectral reflective properties of a natural background and contains binders which are transparent in the far IR range, is improved in the radar spectral range by providing the metal layer in the form of spaced squares or rectangles whose long dimension is smaller than ½ lambda of the largest radar wavelength used for reconnaissance and larger than ½ lambda of the radar wavelength used for homing missiles and bullets. The base layer consists of woven strips of polyethylene material forming squares or rectangles which are metallized on both sides and then covered with polyethylene film coated with liquid polyethylene adhesive. The adhesive fills in the spaces between the strips thus isolating the squares or rectangles from each other and preventing conductivity.

10 Claims, 5 Drawing Sheets

BROAD BAND CAMOUFLAGE SCREEN HAVING A FREQUENCY DEPENDENT RADAR ATTENUATION

CROSS REFERENCE TO RELATED APPLICATION

This application is a continuation-in-part application of Ser. No. 718,080, filed Apr. 1, 1985, now U.S. Pat. No. 4,640,851, issued Feb. 3, 1987.

BACKGROUND OF THE INVENTION

The invention relates to camouflage materials, particularly a camouflage screen for military targets, effective in the spectral range from visible light to radar waves.

In general, the present invention is an improvement in the type of camouflage material described in U.S. Pat. Nos. 4,495,239 and 4,423,104 which are incorporated herein by reference. U.S. Pat. No. 4,495,239 relates to a camouflage material having a broad-band effect in the visible portion of the spectrum, the IR region of the spectrum from 1 to 20 micrometers and the radar region from 3 GHz to 3,000 GHz. It comprises a base layer on which is applied a vapor deposited metallic reflecting layer having a surface resistivity of 0.1 to 10 ohms per square and followed by a paint layer containing pigments which have a reflectivity similar, in the visible and near infrared portion of the spectrum, to that of the natural background, e.g., chlorophyll. The paint layer contains a binder which has good transparency in the atmospheric windows II (3–5 $\mu$m) and III (8–14 $\mu$m) of the far infrared portion of the spectrum.

The basic camouflage material as above described may be further modified as set forth in U.S. Pat. No. 4,423,104. In this patent the camouflage material consists of a net to which is attached a garnishing material comprising two or more layers of the wide-band camouflage material affixed in patches so as to provide spaces therebetween in each layer but arranged so that there is a partial overlap of the patches in one layer on those in another layer thus preventing radiation from penetrating the net. This better imitates the gaps occurring in natural growth, for instance between individual branches.

SUMMARY OF THE INVENTION

The present invenion has as its object to provide a camouflage screen which will be effective in the spectral range from visible light to radar waves, and which will have a frequency dependent radar attenuation. Accordingly, the camouflage screen garnishing material is characterized, according to the invention, by having the thermal reflecting metallic layer in the form of small squares (or rectangles), so that a radar frequency dependence results as a function of the size of these squares. The squares should have a length and/or width which is in the magnitude of the shortest wavelength to be reflected, i.e. they should not be longer and/or larger than approximately 1 cm for a net permeable to 3 cm wavelengths. In other words, they should be smaller than ½ lambda of the longest radar wavelength used for reconnaissance systems and larger than ½ lambda of the radar wavelength used for homing missiles and bullets. Wavelengths of 1 cm and less will be reflected by these patterns. Since the squares are very large compared to the IR wavelength, they reflect the IR waves from 4–5.5 $\mu$m or 8 to 14 $\mu$m very well. This special formation imitates nature in that the long radar waves (3 cm) are not as strongly reflected as the 1 cm or 3 mm radar waves. Millimeter waves are increasingly applied in the military field (e.g. for homing heads, missiles and larger bullets).

DETAILED DESCRIPTION

Suitable textile materials which can serve as a base material for the garnishing camouflage material of the present invention include polyvinyl, polyamide, polyethylene, polypropylene or polyester fibers. The preferred fibers are of polyamide, coated with plasticized PVC consisting of a blend of 1 part poly(methacrylate) and 2 parts of a copolymer consisting of 86% vinyl chloride, 13% vinyl acetate and 17% maleic acid.

Thermally transparent binders for the camouflage paint layer include cyclic rubber, butyl rubber, polyethylene, polyethylene-vinyl acetate copolymers and chlorinated polypropylene. Suitable colorants and pigments for the paint layer include chromium oxide green, 4-chloro-2-nitranilide yellow, azine black toner, toludine red toner, titanium dioxide, iron oxide and ultramarine blue.

Figure 1:
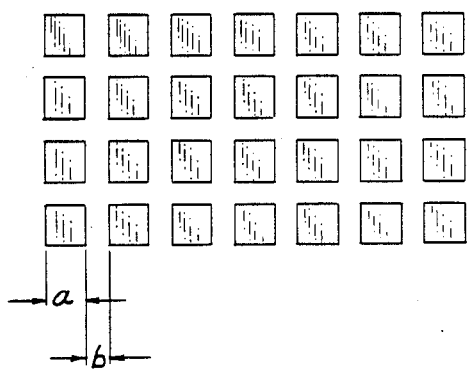
FIG. 1 illustrates a pattern of metallic squares in which the length of the squares is approximately 8 mm and the distance between the squares is 1–2 mm.
Figure 2:
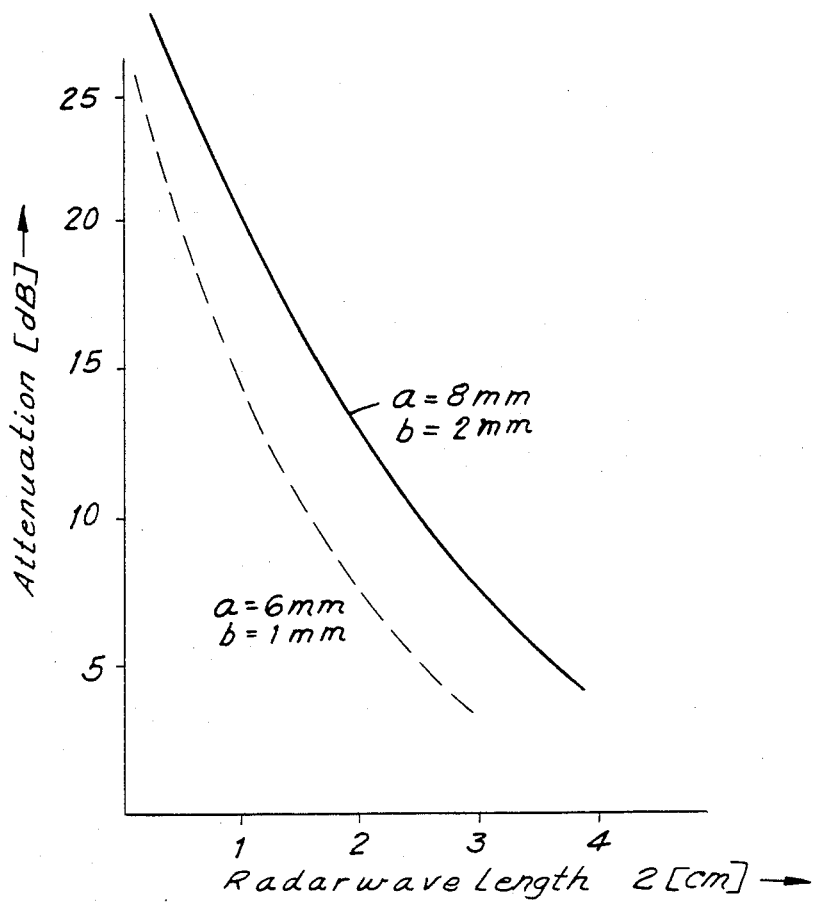
FIG. 2 is a graph showing the frequency dependence measured of the attenuation of a plastic foil coated with metallic squares of approximately 8 mm widths and 2 mm spaces.

The reflective metallic layer which is deposited as squares, rectangles or circular disks, preferably squares, (FIG. 1), may be formed from aluminum, copper or zinc, preferably aluminum. For metallic squares having a width (a) of 8 mm and a spacing (b) of 2 mm, the radar reflection is 7 dB at 10 GHz (3 cm), 20 dB at 30 GHz and greater than 40 dB at 100 GHz. If the squares have a width (a) of 6 mm and the space is 1 mm, the radar reflection is 3 dB at 10 GHz and 15 dB at 30 GHz and greater than 30 dB at 100 GHz. A similar frequency dependence of the radar reflection was measured in nature.

Figure 3:
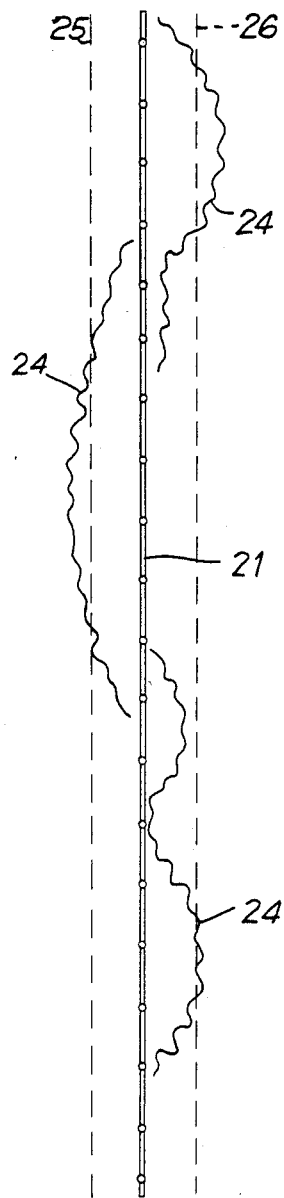
FIG. 3 illustrates a net having two layers of partially overlapping patches of camouflage material in wavy or corrugated form.

In FIG. 3, a support net 21 has trim patches 24 mounted on opposite sides of the support net 21 in two planes 25 and 26.

If the radar screens are formed in a similar manner as shown in FIG. 3, the long radar waves can partially penetrate, the brilliance of the screens decreases and it is not possible to detect them by far reaching radar units with artificial antennas. Thus, the detection possibility of the screens by means of radar waves, as used in modern electronic reconnaissance aircrafts, is considerably reduced. (The retro-reflection is considerably smaller.)

It is common practice to provide crescent-shaped cuts or slits in the garnishing material to adapt the temperature of the camouflage net to that of the environment due to the natural convection of air and wind.

The method of metallizing the whole surface of the garnishing material means that the holes caused by the necessary incisement act as reflective slot antennas and increase the retro-reflection considerably. The formation of the small squares interrupts the circulation by the slot antennas and thus reduces the reflection to a tolerable extent.

The incised contour of the garnishing material grouped similar to the way shown in FIG. 3 provides reflection to all sides at short radar wavelengths, as is shown in nature by bushes, foliage, trees. The result is a radar frequency dependent reflection of the camouflaging screens, which corresponds largely to the reflection of the natural background, when the metallic reflective layer of the garnishing material is properly formed into rectangular and square elements. These elements can also have other geometric configurations, such as small circular disks. However, the squares show the most satisfactory results.

When applying another layer behind the thermal reflecting coating, which is partially transparent to longer radar waves (3 cm), another coating containing dipoles is able to absorb these radar waves (it is advantageous to put these dipoles behind the spaces between the squares). The attenuation for longer radar waves will increase, whereas the brilliance of the screen diminishes. Camouflage materials containing randomly distributed dipole materials having semiconductive properties to absorb radar waves are disclosed in Ser. No. 671,562 filed Nov. 15, 1984 in the name of Gunter Pusch, and incorporated herein by reference.

Another advantage of the present invention is that the minimum wavelength can be varied by choosing the width (a) of the squares in order to allow the transmittance of the radar waves. When increasing the width (a), the only result is that shorter wavelengths cannot be transmitted. The transit attenuation of the low-pass filter which is formed by the squares is dependent to a great extent on width (b) or the spaces, which can be varied from 0.5 to approximately 2 mm.

The military goals according to which a smaller transit attentuation for the centimeter radar waves and a higher transit attenuation for the millimeter radar waves is required, can be largely met.

When evaporating a configuration of squares of aluminum on a thermally transparent film (polyethylene) and coating an unevaporated, thermally transparent film on the aluminum evaporated layer, the radar reflection is not affected and the thermal reflection is only slightly affected. The evaporated aluminum layer, which consists of small squares, is thus in-between two films and therefore largely protected against destruction (Example 4).

A thermally transparent color can then be applied on the outside of this film laminate, a measure which provides broad band camouflaging from the visible light to the radar range of the spectrum.

Figure 4A:
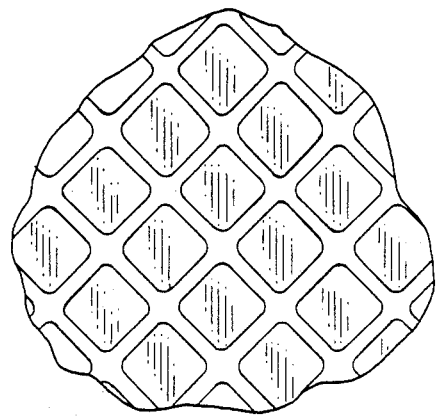
FIGS. 4 A–C illustrate three different patterns of metallic squares.

FIG. 4 shows three different patterns obtained by evaporation of aluminum through different textile lattices onto a textile or non-woven fabric base or a stretched polyethylene film.

FIGS. 5 A-B show the process for manufacturing a laminated, stretched polyethylene film with evaporated patches of aluminum in-between the films.

EXAMPLE 1

A woven nylon textile material of about 60 g/m$^2$ was coated with about 15 g/m$^2$ of a plasticized polyvinyl chloride by spraying with a 20% solution in methyl ethyl ketone. After being allowed to dry, the coated textile material was coated on both sides with 20 nanometers of pure aluminum by vapor deposition under vacuum in a pattern as in FIG. 4A by depositing through a mesh of polyester textile material to provide spaces of 2 mm between 8 mm squares of deposited aluminum. The metallized coating was treated with a 30% solution of chlorinated polypropylene to provide a primer coating of 0.5 g/m$^2$. After the primer coating was dried, a camouflage paint was applied. The paint contained chromium oxide green as a pigment in a polyethylene-vinyl acetate copolymer binder. The pigment and binder had previously been ground together until the average particle size of the pigment was about 1 to 3 microns. Such fine grinding obtains good reflectivity in the visible and near-infrared, with good transparency, thus low absorption/emissivity in the far infrared. After the paint was dry, a final protective coating of polyolefin resin was applied by spraying from a 20% solution in methyl ethyl ketone. Patches of this material were glued to both sides of a support net made of polyester fibers so that overlappying of the covered areas occurs to prevent direct transmission of reconnaissance radiation through the camouflage material.

EXAMPLE 2

Figure 4B:
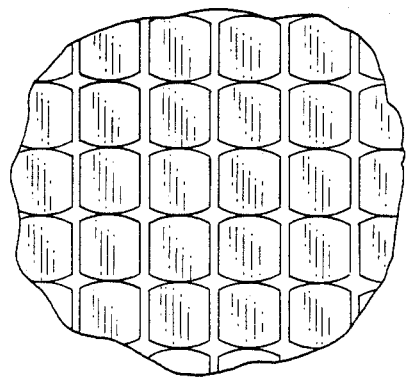
Figure 4C:
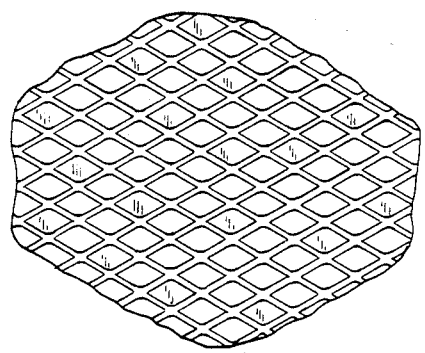

A non-woven polyethylene fabric of about 45 g/m$^2$ was coated with a polyurethane adhesive and a stretched polyethylene film, previously coated with 30 nanometers of aluminum by vapor deposition in a pattern of squares similar to FIG. 4B was applied by rolling. Then the metallized film surface was coated with 1 g/m$^2$ of a primer consisting of cyclic rubber from a 15% toluene solution. After drying a camouflage paint was applied in random thickness. The paint contained a mixture of chromium oxide green and 4-chloro-2-nitranilide yellow; azine black toner and toludine red toner; and ultramarine 2 toner with a article size of about 1 to 3 microns applied in a conventional camouflage pattern of olive drab, black and blue areas. The binder was a copolymer of polyethylene and vinyl acetate which had been previously ground with the pigment. The final protective coating was the same as in Example 1. The material was crimped to form a corrugated surface and applied in patches onto both sides of a nylon support net.

EXAMPLE 3

A textile fabric of woven polyester fibers about 0.5 mm in diameter was coated with a 50 μm thick layer of polyethylene containing 10% by volume of hair-like filaments of stainless steel having a length of 1.5 to 3 mm which function as a semiconductor. A 50 mm thick film of aluminum was vapor deposited in a pattern similar to FIG. 4C under vacuum. The aluminum layer was then coated with a 10 μm layer of chlorinated polypropylene containing an optically camouflaging pattern of chromium oxide green, iron oxide and titanium dioxide. Patches of this material were slit to form crescent-shaped slits and attached by gluing to both sides of a nylon support net.

EXAMPLE 4

Figure 5A:
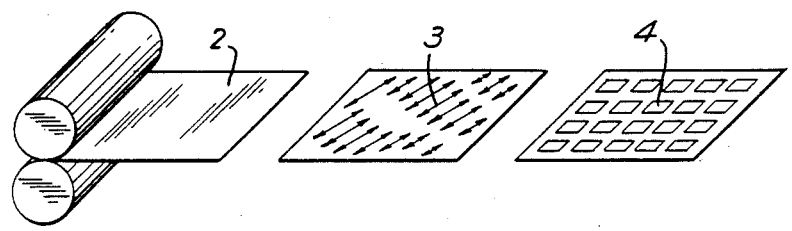
FIGS. 5 A–B illustrate the manufacturing of a camouflage material made of 2 laminated stretched polyethylene films.
Figure 5B:
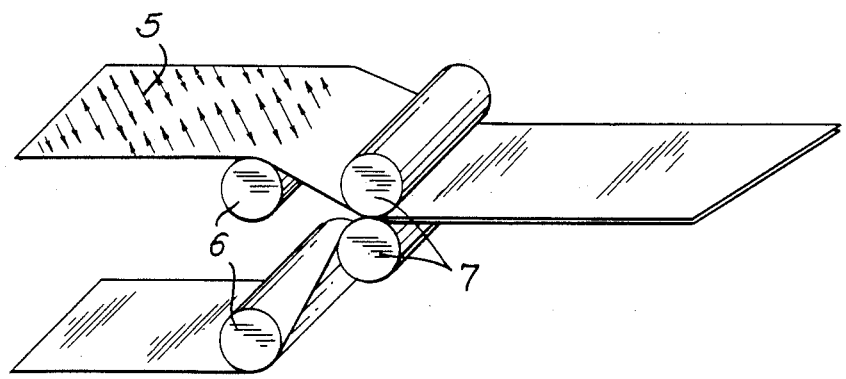
Figure 6:
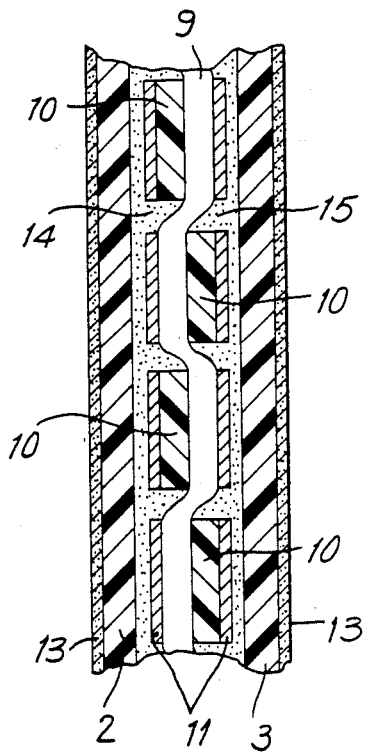
FIG. 6 is a cross-sectional view of one embodiment of the camouflage material according to the invention wherein the base material comprises woven polyethylene strips.

In FIG. 5A, extruder 1 extrudes a polyethylene film 2. This film is stretched in an angle of 45 degrees to the longitudinal axis to form a stretched polyethylene film 3. Aluminum patches are deposited thereon by evaporation under vacuum to form an aluminum coated stretched polyethylene film 4. FIG. 5B shows that a second stretched PE-film 5, which has a stretched direction perpendicular to that of film 4 is laminated with film 4 by the laminator 6,7 so that the aluminum patches are in the middle of the two films and therefore have a very good protection against corrosion and abrasion. The thermal transmission of the metallized patches is effective to both sides. The upper and lower sides of this laminate are then coated with the well-known thermally translucent paints.

EXAMPLE 5

In this case, the garnishing material consists of a base layer made of polyethylene strips 9, 10 woven with each other, so that the structural feature corresponds to that of a woven fabric. As a result, these strips form small squares (similar to a chess board), with an edge length corresponding to the radar wave length in question (see FIG. 1). A thin metal layer 11 is evaporated on each side of these squares. The outer surfaces of the squares are coated with a polyethylene film 2, 3 of about 20 micron thickness. By means of liquid polyethylene adhesive 14, 15 of approx. 10 g/sqm, the polyethylene film 2, 3 is glued to the base layer 8 and additionally the gaps between the small PE strips are filled in. Thus the individual squares are completely isolated from each other an no conductivity is possible. The outer surfaces of the thus formed laminated material are coated with camouflaging paints 13 as mentioned in the foregoing examples.

Although the invention has been described with respect to specific embodiments, it is understood that various modifications may be made without departing from the scope of the invention as defined in the following claims.

I claim:

1. A camouflage material having a wide-band effect ranging from the visual portion of the spectrum up through the radar region of the spectrum, said material comprising a base layer consisting of woven strips of polyethylene material forming rectangles or squares whose long dimension is smaller than ½ lambda of the largest radar wavelength used for reconnaissance systems and larger than ½ lambda of the radar wavelength used for homing missiles and bullets; an intermediate homogeneous metal layer on said base layer reflective in the range of terrestrial thermal radiation as well as in the radar region of the spectrum and having a specific surface resistivity of not more than 0.5 to 10 ohms per square; and an outer camouflage paint layer applied on said reflective metal layer, said paint containing coloring matter having reflective properties in the visible and near IR spectral regions that are similar to the natural background and containing a binder having high transparency characteristics in the spectral regions of the atmospheric windows II (3–5 $\mu$m) and III (8–14 $\mu$m); wherein the emissivity of the camouflage paint in windows II and III varies over the surface of the material and varies between 50 and 90% in window II and between 60 and 95% in window III and wherein the metal is selected from the group consisting of aluminum, copper, zinc and its alloys.

2. The camouflage material according to claim 1 in the form of garnishing patches having punched slits, and attached to a support net in two planes.

3. The camouflage material according to claim 1, further comprising a thermoplastic layer containing radar absorbing randomly distributed dipoles having semi-conductive properties, said thermoplastic layer being located between said base layer and said reflective metal layer.

4. The camouflage material according to claim 1, wherein length of the rectangles or squares is about 4 to 6 mm and the spaces between the rectangles or squares have a width between about 0.5 and 2 mm so that the transit attenuation for centimeter waves attains a required value.

5. The camouflage material according to claim 4, wherein the length of the squares is about 8 mm and the space between the squares is about 1–2 mm.

6. The camouflage material according to claim 1, wherein the metallic layer is formed on both sides of the base layer.

7. The camouflage material according to claim 6, wherein the coloring matter of the paint comprises thermally transparent colors.

8. The camouflage material according to claim 6 further comprising a film of polyethylene adhered to each metallic layer by means of a liquid polyethylene adhesive.

9. The camouflage material according to claim 8, wherein the adhesive fills in between the strips of polyethylene material so that the rectangles or squares are completely isolated from each other.

10. The camouflage material according to claim 8, wherein the thermally transparent films are stretched polyethylene films stretched perpendicularly to each other.

* * * * *